United States Patent [19]

Kuc, Sr.

[11] Patent Number: 5,114,648
[45] Date of Patent: May 19, 1992

[54] METHOD OF PRODUCING PRODUCTS FROM RUBBER COMPOSITIONS

[76] Inventor: John Kuc, Sr., 131 Pusey Mill Rd., Lincoln, University, Pa. 19352

[21] Appl. No.: 676,513

[22] Filed: Mar. 28, 1991

[51] Int. Cl.⁵ .................... B29B 7/42; B29B 9/06
[52] U.S. Cl. .................... 264/134; 208/23;
264/123; 264/145; 264/211.21; 264/349;
264/DIG. 69; 264/142; 366/79;
427/384; 427/422; 524/62
[58] Field of Search .................... 427/384, 385.5, 220,
427/422; 264/37, 41, 109, 122, 118, 349, DIG.
69, 141, 142, 148, 145, 211.21, DIG. 65, 134;
366/97, 98, 78; 521/45.5; 524/66-70, 62, 63;
208/19, 22, 23, 41; 106/273.1, 285

[56] References Cited

U.S. PATENT DOCUMENTS

| | | | |
|---|---|---|---|
| 2,409,437 | 10/1946 | LaCrosse | 208/23 |
| 2,461,193 | 2/1949 | Banbury et al. | 521/45.5 |
| 3,386,925 | 6/1968 | Dillhoefer | 524/524 |
| 3,991,005 | 11/1976 | Wallace | 264/37 |
| 4,028,288 | 6/1977 | Turner | 264/109 |
| 4,110,420 | 8/1978 | Turner | 264/41 |
| 4,244,841 | 1/1981 | Frankland | 264/122 |
| 4,795,603 | 1/1989 | Nagayasu | 264/37 |

FOREIGN PATENT DOCUMENTS 3313470 10/1984 Fed. Rep. of Germany ... 106/273.1

Primary Examiner—Jeffery Thurlow
Assistant Examiner—Mathieu Vargot
Attorney, Agent, or Firm—Morton J. Rosenberg; David I. Klein

[57] ABSTRACT

A process for producing thermoplastic resin products where granulated or particulate vulcanized rubber is sprayed by a heated heavy paraffin distillate composition to form a first intermediate mixture composition. The first intermediate mixture composition is passed through a heating chamber on a conveyor and combined with particulate thermoplastic scrap material in an approximating weight percentage of 30% thermoplastic material to 70% first intermediate mixture material. The combination forms a second intermediate mixture composition which is masticated in a masticator and extruded through a single screw feed mechanism for pelletizing and producing thermoplastic resin products which are useful for molding.

17 Claims, 1 Drawing Sheet

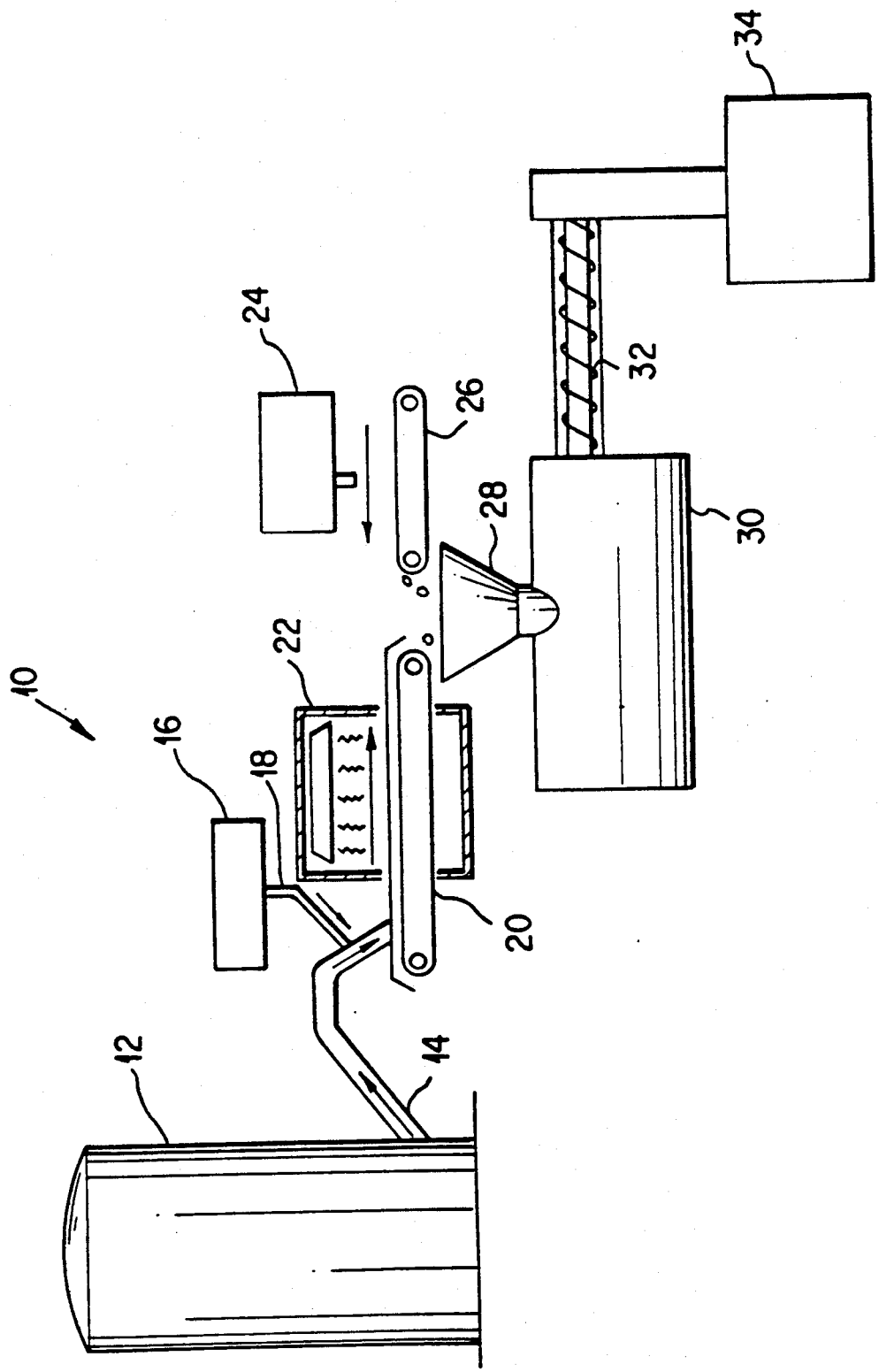

METHOD OF PRODUCING PRODUCTS FROM RUBBER COMPOSITIONS

BACKGROUND OF THE INVENTION

This invention is directed to a process for producing products from rubber compositions. In particular, this invention is directed to the production of products from scrap or waste rubber products. More in particular, this invention is directed to a process for producing products from scrap rubber compositions in combination with thermoplastic compositions which are taken from the waste stream. Still further, this invention is directed to a process for producing products wherein scrap, granulated rubber compositions are mixed with a paraffin distillate composition and then heated for introducing a scrap thermoplastic composition. More in particular, this invention is directed to a process for producing products where a thermoplastic composition and granulated rubber composition is mixed within a masticator to form a mixture composition which may be extruded into a final composition useful for molding or some like technique. Further, the subject invention directs itself to a method for producing thermoplastic resin in a form that has the ability of having a through put of at least 6500 pounds per hour or more.

PRIOR ART

Various compositions using vulcanized rubber are known in the art. However, in such prior art methods and products, the rubber particle is generally encapsulated by a subsequent composition as opposed to a devulcanizing process to form a substantially homogeneous mixture composition. In general prior art systems and methods utilizing scrap rubber particulates having differing compositions generally only allow a low output between 70-200 pounds of material product per hour. Additionally, catalysts used in such processes are expensive which increases the costs of such aggregate compositions.

Other prior art methods and systems produce non-homogeneous thermoplastic type resins which have voids in their composition and do not produce products which are devoid of fissures and other discontinuities.

SUMMARY OF THE INVENTION

This invention provides for a process for producing thermoplastic resin products from at least a partially vulcanized rubber composition. The partially vulcanized rubber composition has introduced to it a heavy paraffin distillate composition to form a first intermediate mixture composition. The first intermediate mixture composition is heated and a thermoplastic composition is introduced to the first intermediate mixture composition to form a second intermediate composition. The second intermediate composition is masticated and extruded for producing a final mixture composition which may be molded or formed into a thermoplastic resin product.

BRIEF DESCRIPTION OF THE DRAWING

The Figure is a block diagram of the process for producing thermoplastic resin products.

DESCRIPTION OF THE PREFERRED EMBODIMENTS

Referring now to the Figure, there is shown a rubber and plastic product production system 10 for producing products from at least a partially vulcanized initial rubber composition. In overall concept, as will be described in following paragraphs, granulated or particulates of scrap rubber and thermoplastic particulates, generally derived from waste material are treated and combined in a manner to produce thermoplastic resin products not having voids in the final product formulation.

Initially, at least a partially vulcanized rubber composition is combined with a heavy paraffin distillate composition extract and then further combined with scrap thermoplastic compositions in steps to be further described in following paragraphs. It is believed that during an initial process step the at least partially vulcanized rubber composition is somewhat devulcanized. The devulcanized rubber composition is combined with a heavy paraffin distillate composition extract and a scrap thermoplastic composition which is masticated to form a homogenized composition. It is believed that the rubber composition is homogenized within the thermoplastic and when extruded or molded forms a final product which is generally non-porous. The process as herein described is capable of producing a myriad of products which can either be molded or formed directly such as trash cans, nursery containers, palettes, drain pipes and addresses what is generally termed non-critical parts. Further, the process produces a rubber and thermoplastic compound which may be molded or otherwise treated in generally the same fashion and manner as thermoplastic materials to produce a wide range of products which may be used domestically or commercially.

Referring now to the Figure, there s shown rubber/plastic product production system 10 for production of products from a rubber and thermoplastic composition. At least partially vulcanized rubber compositions are purchased and may be in the form of vehicular tires which may be termed scrap rubber. The scrap rubber is ground, pulverized or otherwise formed into a particle size that is usable for the process system 10 as herein shown. Generally, mesh sizes of 0.25 inches and less is applicable to product production system 10.

Commercially, rubber compositions having a mesh size of 0.25 inches and lower is given the standard term crumb. The rubber crumb is purchased from commercial parties and the rubber crumb is brought into system 10 with an initial removal of contaminants. The at least partially vulcanized rubber compositions of this process may be treated by passing such through a magnetic field which will pick up various metal contaminants which originally existed in the manufactured tire or other foreign contaminants that have gotten into the rubber composition through the manufacturing process or external causes. The passage through a magnetic field and other metal decontamination processes are pre-processing stages not shown in the Figure. Basically, the at least partially vulcanized rubber composition or crumb material is subjected to one or more standard pre-processing steps to remove unwanted elements or compounds from the crumb material.

The at least partially vulcanized rubber composition in crumb form having a particle size of 0.25 inches or less is supplied or provided to rubber silo 12 in the initial stages of product production system 10. Rubber silo 12 may simply be a closed housing having an outlet or a hopper not important to the inventive concept as herein described with the exception that the rubber composition is contained within silo 12 until it is ready for application to the remaining portions of the process system 10.

Rubber crumb passes from silo 12 through conduit or conveyor 14 and is combined with a heavy paraffinic distillate composition contained in paraffin distillate container 16 and passing through distillate conduit 18.

The combination of the at least partially vulcanized rubber composition and heavy paraffin distillate composition forms a first intermediate mixture composition which is loaded on conveyor 20. The heavy paraffinic distillate may be commercially purchased and may be a product such as TYRSOLV manufactured and produced by Tyrplex Corporation of Kelton, Pa., which is a highly aromatic composition having a specific gravity approximating 1.0 with an evaporation rate approximately $10^3$ times slower than ethyl ether. In a special devulcanization application the heavy paraffinic distillate may be mixed with fly ash to aid in the devulcanization process and also act as an inexpensive extender. However, other paraffinic distillate solvent extracts may be used having a vapor density between 8.0-3.0. Additionally, the boiling point of the particular paraffinic distillate solvent extract should have a boiling point between 500° F. and 1000° F.

The paraffinic distillate solvent extract may be sprayed onto the at least partially vulcanized rubber composition. The heavy paraffinic distillate extract s heated in paraffin distillate container 16 through a standard heating procedure such as infrared heating or some like technique. The paraffinic distillate extraction is heated to approximately 180° F. within container 16 and then passed through distillate conduit 18 to be sprayed onto the incoming vulcanized rubber composition passing in rubber conduit 14.

The heated paraffinic distillate composition extract is provided in an amount by weight within the approximate range of 3.0%–10.0% of the weight of the at least partially vulcanized rubber composition passing in conduit 14.

The heating of the heavy paraffinic distillate extract in container 16 provides for a somewhat liquid composition passing through distillate conduit 18 and the viscosity is lowered to approximately the viscosity of water. The heated paraffinic distillate has a viscosity approximating 0.70 Centipoise.

In this manner, the at least partially vulcanized rubber composition is coated with the paraffinic distillate composition in the approximate weight percentages previously discussed and applied or introduced to conveyor 20. The first intermediate mixture composition which includes the at least partially vulcanized rubber crumb and the sprayed on paraffinic distillate extract passes into heating chamber 22. Heating chamber 22 may have incorporated therein infrared tubes, microwave energy systems, or some like heating device not important to the inventive concept as herein described. First intermediate mixture composition is heated within heating chamber 22 to a predetermined temperature within the approximate range of 220° F. to 250° F. Residence time within heating chamber 22 approximates 3.0 minutes for a first intermediate mixture composition flow rate within the approximating range of 4,000–6,500 Lbs/Hr.

It has been found that passage through heating chamber 22 causes the first intermediate mixture composition to become highly viscous and gummy in nature and it has been observed that a blackened color appears on the surface of the first mixture composition. It is believed that there is a chemical reaction which breaks down or attacks the rubber and it is further believed that some devulcanization occurs. The first mixture composition passing from heating chamber 22 is still in particulate form but has softened and the particulates are soft to the touch.

Thermoplastic composition material is maintained in thermoplastic container 24 and generally consists of thermoplastic particulates taken from the domestic and/or commercial waste stream in the form of scrap thermoplastic products.

The thermoplastics are generally found to be primarily in the polyolefin class including the polymers and copolymers taken from the group consisting of polyethelene, polypropylene, polybutenes, and polyisoprenes and combinations thereof. The thermoplastic composition as has been stated is taken generally from the waste stream and is brought into a particulate state having a mesh size of 0.5 inch or less. The general size of the thermoplastic material composition particulates is not critical to the inventive concept as herein described with the exception that the thermoplastic composition taken from the waste stream may be ground up to a dense particle size that is free-flowing and will homogeneously flow and mix with the first intermediate mixture composition passing from heating chamber 22.

The thermoplastic composition is distributed on thermoplastic conveyor 26 and is brought to a hopper 28 for interspersing and mixing with the first intermediate mixture composition to form a second intermediate composition. The second intermediate composition passes through hopper 28 into masticator 30 for homogeneously mixing the thermoplastic composition material and the first intermediate composition material. The introduction of the thermoplastic composition to the first intermediate mixture composition includes providing by weight approximately 30% of thermoplastic composition of the second intermediate composition. Thus, the amount of second intermediate mixture composition passing into masticator 30 includes approximately 70% by weight of the combination of the rubber composition and paraffin distillate extract to 30% by weight of the thermoplastic composition being passed from thermoplastic conveyor 26.

The combined second intermediate composition is heated within masticator 30 to a predetermined temperature within the approximating temperature range of 360° F.–500° F. Masticator 30 may be a double arm mixer system for mastication and is commercially available. The masticator 30 used is a commercially available double arm masticator that continuously feeds directly into screw feed 32 for pellitizing, extruding profiles or calendering.

Masticator 30 may be a standard double arm masticator and the second intermediate mixture composition is heated to a temperature therein within the approximating range of 350° F.–500° F. Due to the fact that scrap thermoplastics taken from the waste stream are being used, the melting temperature may be as high as 400° F. or 420° F.

Using the continuous mixer extruder there can be attained a through put of 6500 per hour of second intermediate mixture composition. At this type of capacity there is a residence time within masticator 30 approximating 10–15 seconds.

The heated and masticated intermediate mixture composition then passes through discharge screw feed 32 which may be a standard single screw extruder for extruding material from masticator 30. Single screw 32 takes the discharged material and conveys it from masticator 30 and may pass it through a die having a series of small openings for extrusion therethrough to allow hot die face cutting well known in the art. In this type of hot die face cutting a rotating arm cuts the material as it passes from single screw member 32.

Once the material is passed through single screw mechanism 32. it may be pelletized in what may be termed a hot face die pelletizer.

Once exiting from the pelletizer the final mixture material is inserted into cooling chamber 34 where the final product material is convection cooled or cooled in some other manner. The final compound is useful as a pelletized resin compound which may be used for injection molding. extrusion. compression molding. calendaring and possibly blow molding.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A process for producing thermoplastic resin products from an at least partially vulcanized rubber composition. including the steps of:
   (a) providing said at least partially vulcanized rubber composition;
   (b) pre-heating a heavy aromatic paraffin distillate composition to a point where said heavy aromatic paraffin distillate has a viscosity approximating 0.70 Centipoise;
   (c) spray coating said heavy aromatic paraffin distillate composition on said vulcanized rubber composition to form a first intermediate mixture composition;
   (d) heating said first intermediate mixture composition;
   (e) introducing a thermoplastic composition to said first intermediate mixture composition to form a second intermediate composition;
   (f) masticating said second intermediate composition subsequent to said introduction of said thermoplastic composition; and
   (g) extruding said masticated second intermediate composition for producing a final mixture composition which is molded or formed into said products.

2. The process as recited in claim 1 where the step of providing said at least partially vulcanized rubber composition includes the step of granulating said at least partially vulcanized rubber composition to a predetermined mesh size.

3. The process as recited in claim 2 where the step of granulating includes the step of establishing a mesh size of said at least partially vulcanized rubber composition approximating 0.25 inches.

4. The process as recited in claim 1 where the step of providing said at least partially vulcanized rubber composition includes the step of removing contaminants from said rubber composition.

5. The process as recited in claim 1 where said step of introducing said heavy paraffin distillate includes the step of providing a heavy paraffinic distillate solvent extract having a boiling point within the approximate range of 500° F.-1000° F.

6. The process as recited in claim 5 where said heavy paraffinic distillate solvent extract has a vapor density within the approximate range of 8.0-13.0 Lbs/Cu.ft.

7. The process as recited in claim 1 where the step of pre-heating said heavy paraffin distillate composition includes the step of establishing a predetermined temperature approximating 180° F.

8. The process as recited in claim 1 where the step of introducing said heavy paraffin distillate composition includes the step of providing said heavy paraffin distillate composition in an amount by weight within the approximate range of 3.0%-10.0% of the weight of said at least partially vulcanized rubber composition.

9. The process as recited in claim 1 where the step of heating said first intermediate mixture composition includes the step of heating said first intermediate mixture composition to a predetermined temperature within the approximate range of 220° F. -250° F.

10. The process as recited in claim 9 where said first intermediate mixture composition is maintained at said predetermined temperature for a time approximating 3.0 minutes.

11. The process as recited in claim 1 where the step of introducing said thermoplastic composition to said first intermediate mixture composition includes the step of providing by weight approximately 30% of thermoplastic composition of said second intermediate composition.

12. The process as recited in claim 1 where the step of masticating said second intermediate composition includes the step of heating said second intermediate composition to a predetermined temperature within the approximating temperature range of 350° F.-500° F.

13. The process as recited in claim 12 where the step of heating includes the step of introducing said second intermediate composition to a double arm mixer system for mastication.

14. The process as recited in claim 1 where the step of extruding includes the step of discharging said masticated second intermediate composition through a screw extruder.

15. The process as recited in claim 1 where the step of extruding is followed by the step of pelletizing said masticated second intermediate composition.

16. The process as recited in claim 1 where the step of extruding is followed by the step of cooling said masticated second intermediate composition.

17. The process as recited in claim 1 wherein said thermoplastic composition includes a polyolefin composition including a predetermined weight composition of polymers and copolymers selected from the group consisting of polyethylene, polypropylene, polybutene, polyisoprene and combinations thereof.

* * * * *